Figure 1:
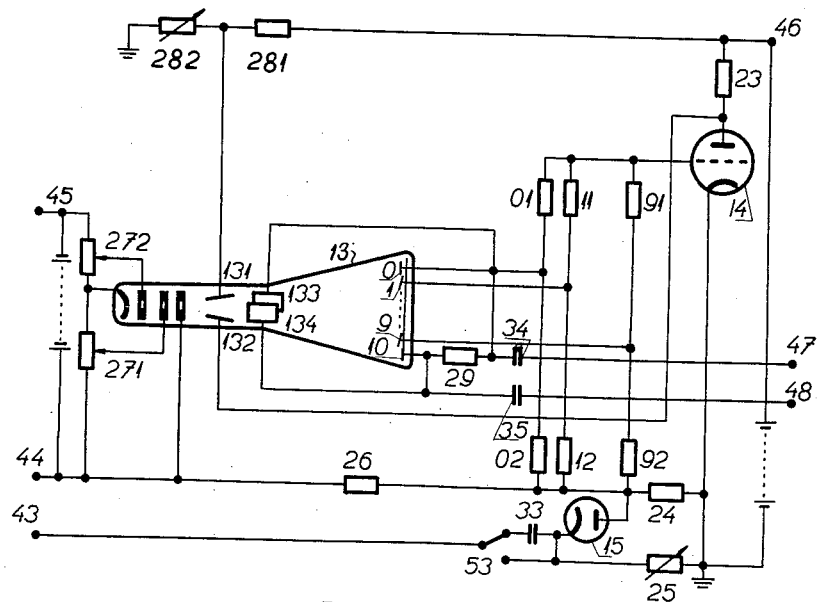

March 4, 1952

E. PODSKALSKÝ

2,588,287

IMPULSE METERING DEVICE

Filed June 10, 1950

INVENTOR
Emil Podskalský
BY
ATTORNEY

Patented Mar. 4, 1952

2,588,287

UNITED STATES PATENT OFFICE 2,588,287

IMPULSE METERING DEVICE

Emil Podskalský, Prague, Czechoslovakia, assignor of one-half to Tesla, National Corporation, Prague, Czechoslovakia, a corporation of Czechoslovakia Application June 10, 1950, Serial No. 167,474
In Czechoslovakia June 29, 1949

5 Claims. (Cl. 315—21)

The present invention relates to a device for counting electric impulses and for measuring the duration thereof, and employs a cathode ray tube which is provided with several terminal anodes and associated with means for locking the electron beam on the terminal anodes.

Heretofore known electronic devices for quick counting of electric impulses, or similar purposes, are complicated and require a great number of circuits and tubes. If such devices employ a cathode ray tube with several anodes, complicated circuits with more than one tube are required to lock the position of the deflected beam, as disclosed for example by the selector described in the U. S. A. Patent No. 2,224,677. On the other hand, known devices for measuring impulse duration or time intervals, for example systems based on the principle of counting impulses from a stabilized oscillator, are either complicated or not adapted to measure intervals which are shorter than, say, several microseconds, the accuracy of the device when measuring very short intervals being rather low.

The present invention removes or reduces said drawbacks of heretofore known systems.

One object of the present invention is to provide stabilizing circuits for locking the electron beam on an anode to which it has been deflected by an impulse. This object is principally achieved by connecting the anodes to potentiometers placed between the cathode and grid of a single control tube the anode circuit of which provides the locking voltage for the deflected beam, and by equalizing the time constants of the stabilizing circuits.

Another object of the invention is the arrangement of a return path for the electron beam from the last sweep anode to the first neutral anode, which is principally achieved by connecting the output of the last sweep anode, through a resistor, to the output of the neutral anode; by providing means associated with said resistor for lateral deflection of the beam, and by providing a suitable time ratio between the longitudinal and lateral deflection of the beam.

The term "sweep anode" in this specification and the appended claims indicates the anode from which latter the beam is returned to the "neutral anode" which indicates the anode struck by the cathode beam before arrival of the first counted or metered impulse.

A further object of the invention is the arrangement of anodes which may conveniently overlap and be inclined to the axis of the anode assembly and the provision of a lateral sweep elongation associated with the last sweep anode and leading to the neutral anode.

Still another object of the invention is the provision of means for impulse counting comprising a differentiating rectifier, and adjustment of the duration of the impulses in accordance with the time constants of the stabilizing circuits.

Still a further object of the invention is cyclical shifting of the electron beam over the terminal anodes for the purpose of measuring the duration of impulses.

The present invention is distinguished from known systems particularly by the stabilizing circuits for locking the electron beam on an anode, and comprising stabilizing potentiometers connected between the anode and grid of a single control tube; by equalizing the time constants of the stabilizing circuits; and by providing anodes the last of which is associated with a lateral sweep elongation.

The main advantages of the invention are: simplification of the stabilizing circuits; the possibility of counting very short impulses following in quick and even irregular succession; and the possibility of accurate measurement of very short time intervals.

Figure 2:
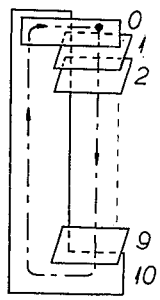

These and other objects, features and advantages of the invention will be apparent from the following description to be read in conjunction with the attached drawings in which Fig. 1 is a schematic circuit diagram of a preferred embodiment of the invention, and Fig. 2 illustrates schematically a preferred embodiment of the anodes of said invention.

In Fig. 1 the numeral 13 indicates a cathode ray tube provided with means for producing, controlling, accelerating and concentrating an electron beam, said beams being connected in a known manner to a direct current source through potentiometer 271, 272 and connecting points 44, 45. The positive pole of the source is grounded through resistors 26, 24. The cathode ray tube is also provided with means for electrostatic deflection of the electron beam comprising two pairs of deflection plates 131, 132 and 133, 134 for vertical and horizontal deflection, respectively. Pair 131, 132 deflects the electron beam so that it successively strikes anodes 0 through 10 due to the effect of impulses as will be shown below. Anodes 2 through 8 which are not shown in the figure are indicated by the dotted line. Pair 133, 134 deflects the electron beam laterally with regard to the anode assembly as soon as the beam strikes the last sweep anode 10. Potential $U_1$ of plate 131 is tapped off potentiometer 281, 282 connected between terminal 46 and ground. The positive pole of the direct current source is connected to terminal 46 and the negative pole thereof is grounded. Potential U₂ of plate 132 is determined by the potential of the source on terminal 46 less the potential drop across resistor 23 of control tube 14 the cathode of which is grounded. Although tube 14 is shown in the drawing as a triode, it may also have more than three electrodes of known suitable arrangement.

The stabilizing circuits for locking the electron beam on the anode to which it has been deflected by the signal, and which it struck by the end of the signal, comprise, on the one hand, control tube 14 with anode resistor 23, stabilizing potentiometers connected between the cathode and grid of tube 14 and connections to deflecting plates 131, 132; on the other hand, circuits closed by the electron beam and incorporating the anode, the output circuit thereof, i. e. the connection to the stabilizing potentiometer, resistors 26 and 271, also the cathode of tube 13 and the electron beam. In Fig. 1 ohmic resistors have been drawn by way of example of the embodiment of the impedances of the stabilizing potentiometers. The neutral anode 0 is connected by means of a lead-out from tube 13 to a tapping between resistors 01 and 02 of stabilizing potentiometer 01, 02, 24 connected between the cathode and grid of tube 14. In a similar way, anode 1 is connected to a tapping between resistors 11 and 12 of potentiometer 11, 12, 24, anode 9 is connected to a tapping between resistors 91 and 92 of potentiometer 91, 92, 24, and the last sweep anode 10 is connected through resistor 29 to the lead-out from neutral anode 0. The stabilizing potentiometers to which anodes 2 through 8 are connected have not been shown in the drawing. Resistor 24 is common to all the stabilizing potentiometers. Resistor 29 is provided with tappings leading to plates 133, 134 which deflect the electron beam laterally with respect to the anodes. Resistor 29 is provided with further tappings leading through capacitors 34, 35 to terminals 47, 48 which supply divisional impulses to the counting circuits when the electron beam strikes anode 10, as will be explained below.

The advantage of the parallel arrangement of stabilizing potentiometers between the grid and cathode of control tube 14 over the series arrangement thereof resides in the fact that adjustment of some resistor in some parallel branch affects the values of the other resistors of the stabilizing system to a lesser degree than in the series arrangement.

Terminal 43 to which the counted or metered impulses are fed is connected, on the one hand, through capacitor 33 to the cathode of rectifier diode 15; on the other hand, through variable resistor 25 to ground. The anode of diode 15 is grounded through resistor 24. Capacitor 33 can be shunted by switch 53 during measurement of the duration of impulses. When counting impulses, switch 53 is open, and diode 15 together with capacitor 33 and resistors 24, 25 operates as a differentiating rectifier, as will be explained hereinafter.

Fig. 2 shows schematically a preferred arrangement of the anodes looking from the inside of the cathode ray tube. Neutral anode 0 is longer than the remaining anodes, and sweep anode 10 is provided with an elongation extending along the remaining anodes and partially underneath the same and terminating underneath anode 0. The remaining anodes 1 through 9 are mounted at an angle to their common axis. Anodes 3 through 8 which have not been shown in the drawing are the same as anodes 1, 2, 9. All terminal anodes are conductive, insulated against each other and partially overlapping. They are connected to lead-out wires passing vacuum-tightly through the widened bottom of the cathode ray tube.

It should, of course, be understood that other embodiments of the anode assembly are possible as well. They may, for example, be in a plane with their common axis, not overlapping, or, if overlapping, provided with oblique or bent extensions protruding underneath the adjacent anode.

The number of anodes shown in the described embodiment is convenient when counting is carried out in the decade system. For other purposes, however, a different number of anodes might be more convenient. Reduction of the effective number of anodes can be obtained by connecting resistor 29 to the lead-out from another anode, in addition to being conected to anode 10, and by tapping off connections to plates 133, 134 from resistor 29 connected in said way. In this manner, the device is adapted for dividing the number of impulses by a number corresponding to the number of the anode to which resistor 29 has been connected. Instead of being arranged in a straight line, the anodes can also be grouped in another formation, for example in a circle. In such cases, where the formation differs from the straight line, lateral deflection of the electron beam must be arranged differently from the embodiment described.

In the neutral position, before the counted impulses are applied, the electron beam strikes neutral anode 0 (Fig. 1). The current contained in the beam divides into two branches: one portion flows through resistor 02, the second portion flows through resistor 01 and the parallel connected other nine branches of the stabilizing potentiometers. The two portions of the current contained in the beam then meet again, and the current returns through resistors 26, 271, cathode ray tube 13, and the electron beam to anode 0. The voltage drop across the combination of parallel resistor pairs 11+12, 21+22, etc. through 91+92 produced by the current flowing through resistor 01 determines the negative grid bias of control tube 14 because no current flows through resistor 24. This grid bias determines the anode current of tube 14, the voltage drop across resistor 23 and the potential of plate 132. The value of resistor 01 is much higher than the value of resistor 02, so that only a small portion of the current contained in the beam flows through resistor 01, the grid potential of tube 14 is slightly negative, its anode current and the voltage drop across resistor 23 is considerable, and thus the potential of plate 132 is more negative than the potential of plate 131 by a value which causes this potential to maintain the electron beam locked in such a position that it strikes anode 0.

A detailed desdription will now be given of the device according to Fig. 1 when employed as a counter of electric impulses. Negative impulses transformed into an approximately rectangular wave form of suitable amplitude, are supplied to terminal 43. The rhythm of succession of the impulses or the duration thereof is of no importance. Switch 53 is open. On arrival of each signal, a very short differentiated peaked impulse is produced across the combination of capacitor 33 and resistor 25, and during this impulse the cathode of diode 15 is driven more negative than the anode so that current flows through the diode and resistor 24, and the grid of tube 14 is supplied with a negative impulse through the system of stabilizing potentiometers. The current through tube 14 and resistor 23 is thus reduced and the plate 132 becomes more positive. The electron beam which in the neutral position struck neutral anode 0 is deflected and transferred upon anode 1. The transfer of the beam from anode 0 upon anode 1 lags somewhat behind the arrival of the impulse on terminal 43 which fact is mainly due to the time constant $C_{33}R_{25}$ made up of the product of capacitor 33 and the value of resistor 25. The current contained in the beam is again split up in two branches: One portion flows through resistor 12, the remainder flows through resistor 11 and through the other nine parallel branches of the stabilizing potentiometers. The value of resistor 11 is smaller than the value of resistor 01, and the value of resistor 12 is larger than the value of resistor 02, so that a larger current will flow through resistor 11 than through resistor 01 when the electron beam strikes anode 0. This increases the voltage drop across the combination of the remaining nine parallel branches of the stabilizing potentiometers, the grid of tube 14 becomes more negative, the anode current thereof is reduced and the voltage drop across resistor 23 is reduced, plate 132 is driven more positive and the deflected electron beam is locked on anode 1 until arrival of another impulse.

Resistor 26 reduces the capacitive leakage path of the impulses arriving from diode 15.

The position of the deflected electron beam on the terminal anode is maintained in the above mentioned manner, there being a small time lag determined by the time constant of the above mentioned stabilizing circuits, i. e. by the product of the resultant resistance of these circuits and the resultant capacity thereof. In the embodiment shown in Fig. 1, the resultant capacity is the combination of the parasitic capacities of the components of said circuits. The resultant resistances connected to each terminal anode respectively differ from each other due to the graded values of the stabilizing potentiometers. Since, however, the values of the stabilizing potentiometers are small compared with the plate resistances of tubes 13 and 14, and the parasitic capacities of the stabilizing circuits are approximately equal, the time constants of all stabilizing circuits are also approximately equal.

In order to obtain better equalization of the time constants of the stabilizing circuits, a small capacitor may be conveniently connected in parallel with resistor 23, the product of this capacity and the value of resistor 23 being larger than the time constants of the output circuits of the terminal anode. Still exacter equalization of the time constants of the stabilizing circuits is provided by arranging the time constants of the output circuits of all terminal anodes to have the same value. To this end, capacitors having small graded capacity values may be connected in parallel to portions of the stabilizing potentiometers, e. g. to resistors 02 and through 92.

Upon arrival of the front of the counted rectangular impulse on terminal 43 a differentiated impulse is produced on terminal 43, as has already been mentioned, due to the operation of the differentiating circuit 33, 25, the wave form being the first differential with time of the time function of the original wave front.

The wave form, duration and amplitude of the differentiated impulse depend on the time constant of the differentiating circuit which is given by the product $C_{33}.R_{25}$ of the capacity of capacitor 33 and the value of resistor 25. The capacity of capacitor 33 and the value of resistor 25 are small. This enables the counting of impulses following each other in very quick succession and it makes possible equalization of the time constant of the differentiating circuit with regard to the time constant of the stabilizing circuits, as will be explained hereinafter. The time constant of the differentiating circuit, and hence also the duration and amplitude of the differentiated impulse, can be varied by adjustment of the value of resistor 25.

The time required for deflecting the electron beam upon the adjacent terminal anode is for practical purposes determined by the time during which the differentiated impulse reaches its peak value. During the time required by the impulse to die out completely after the electron beam has been deflected upon the adjacent anode, the system provided for locking the beam on this anode comes into action. The new position of the electron beam remains fixed if the dying out time of the differentiated impulse and increase time of the stabilizing voltages up to the maximum value complement each other to give a constant value. Such conditions are approximately obtained if the time constant of the differentiating circuit equals the time constant of the stabilizing circuits. If there are small differences between these time constants, the deflected beam will be slightly shifted over the anode whilst being locked in the new position, without however completely dropping off the respective anode. Larger dimensions of the terminal anode admit larger differences between the time constants, requiring, however, a larger amplitude of the differentiated impulse for deflecting the beam from one anode to another.

By the end of the negative rectangular impulse on terminal 43, a positive differentiated impulse is produced on the cathode of diode 15 due to the operation of the differentiating circuit 33, 25; this latter differentiated impulse is, however, not passed through the diode and does, therefore, not affect the position of the electron beam.

This procedure is repeated upon arrival of the next impulse which deflects the beam upon the adjacent anode.

After the beam has been deflected upon the last or sweep anode 10, the current contained in the beam is passed through resistor 29 and is again split up in two branches: one portion flows through resistor 92, the second portion flows through resistor 01 and the nine parallel branches of the other stabilizing potentiometers. Plate 132 is now at a potential which corresponds to the position of the deflected beam an anode 0. At the same time, due to the voltage drop across resistor 29, plate 133 becomes more positive and plate 134 more negative. Thus, the beam is deflected to the left looking from the inside of tube 13, striking the lateral extension associated with sweep anode 10. Due to the fact that the resistances and capacities in the laterally deflecting circuit are smaller than those of the stabilizing circuit of anode 10, the lateral deflection of the beam is quicker than its return movement to anode 0 along the sweep extension of anode 10. After each 10 impulses the trace of the electron beam over the terminal anodes is as indicated by the dash-dot line in Fig. 2.

A description will now be given of a preferred embodiment of the stabilizing potentiometers according to Fig. 1. In this embodiment, the sum of the two resistors in each parallel branch of the potentiometers is constant and the values of the resistors are graded, differing from each other by a constant value. Assuming the value of resistor 01 in Fig. 1 to be $R_{01}$, of resistor 02 to be $R_{02}$, etc., and the resistors to differ from each other by an increase or decrease $\Delta R$, the values $R_{n1}$, $R_{n2}$ of resistors $n1$, $n2$ connected to the $n$th anode where $n=0 \ldots 9$ are given by the following expressions:

$$R_{n1} + R_{n2} = R$$
$$R_{n2} = R_{02} + n \cdot \Delta R$$

If $R_{23}$ designates the value of resistor 23, $g$ the slope of the linear portion of the grid characteristic, $R_i$ the plate resistance of tube 14, and I designates the intensity of the current of the electron beam in tube 13, the potential on plate 132, when the $n$th anode is struck by the beam, is:

$$U_{2n} = U_1 + (n-5) \cdot \Delta U_2 = U_1 + (n-5) \cdot \frac{R_{23} \cdot R_1}{R_{23} + R_1} \cdot \frac{g \cdot I \cdot \Delta R}{10}$$

where $U_1$ is the potential of plate 131 and $\Delta U_2$ is the increase of the potential of plate 132 due to the differentiating impulse which produces a negative impulse on the grid of tube 14, having an amplitude $$\Delta V_g = -I \cdot \frac{R}{10}$$

The deflecting voltages $U_{2n} - U_1$ are of such values that they lock the electron beam on the $n$th terminal anode until the arrival of the next impulse.

The potential of plate 132 corresponding to the neutral position of the beam on anode 0 is $U_{20} = U_1 - 5 \cdot \Delta U_2$. When the beam strikes the central anode 5, there is $U_{25} = U_1$, when the beam strikes the 9th anode, there is $U_{29} = U_1 + 4 \cdot \Delta U_2$. When the beam strikes the sweep anode 10, there is $U_{210} = U_{20}$.

When the electron beam is deflected from anode 9 upon anode 10 and until the beam is returned to anode 0, a voltage drop is developed across resistor 29. The divisional impulse which is thus produced is fed to terminals 47, 48 through capacitors 34, 35. It is obvious, with the number of anodes shown in the drawing, and resistor 29 connected to the lead-out from the last anode, that it is possible to obtain a divisional impulse from terminals 47, 48 upon arrival of each tenth impulse fed to terminal 43. If resistor 29 is connected to the $n$th anode, the electron beam returns to the neutral anode, and an impulse will appear across terminals 47, 48 after the electron beam has struck the $n$th anode. Means are thus provided for dividing the number of signals by any number from 2 through 10.

When impulses are counted, terminals 47, 48 are connected to further counting means which count tens; this may be followed by other counting means which count hundreds, etc. The remaining ones, corresponding to the position of the beam on the respective anode can be determined, for example, by means of a current metering device connected in the anode circuit of tube 14. The number of tens, hundreds, etc. is found in a similar way. Having regard to the maximum speed at which the counted signals follow each other, a suitable mechanical counting device may be connected after some of the counting stages. An other alternative is to connect to resistor 23 of the device which counts ones, a system which deflects horizontally the electron beam of the indicator cathode ray tube. To resistor 23 of the same device which counts tens, a system is connected which deflects vertically the electron beam of said tube. The corresponding positions of the luminous trace of the beam can be provided with a numerical scale and two-digit results can be read off. The indicator tube can be switched over to any two counting devices for determining all decimal places.

For subtracting pulses, the polarity of rectifier 15 is changed. Terminal 43 is fed with positive impulses and diode 15 passes positive differentiated peaks produced from the wave fronts by the operation of circuit 33, 25. The grid of tube 14 is supplied with positive impulses which make plate 132 more negative and deflect the beam in an upward direction.

The differentiating rectifier can also be connected in manners differing from the embodiment of Fig. 1, for example by omitting resistor 24 and connecting the output of diode 15 to the grid of tube 14 through a sufficiently sized capacitor, the connection between said capacitor and the anode of diode 15 being grounded through a resistor.

A description will now be given of the use of the device for measuring the duration of negative impulses fed to terminal 43, the time duration of which is longer than the time constant of the stabilizing circuits. In this case switch 53 is closed, so that during the impulse the cathode of diode 15 is more negative than the anode thereof, current passes through the diode and resistor 24, an additional negative voltage is applied to the grid of tube 14 through the combination of the branches of the stabilizing potentiometers, the current through tube 14 and resistor 23 is reduced, the potential of plate 132 is made more positive and the beam is deflected from neutral anode 0 upon anode 1. A suitable amplitude of the additional negative voltage of the grid of tube 14 can be obtained by adjustment of the value of the variable resistor 25. The stabilizing circuits adjust the potential of plate 132 in the above mentioned manner, so that the beam strikes anode 1. If the impulse persists, the same additional negative voltage is supplied all the time, also in this position of the beam, to the grid of tube 14 through diode 15 and resistor 24, and further decrease of the current through tube 14 and resistor 23 makes plate 132 still more positive. The beam is shifted to anode 2, etc. Thus, while the impulse persists, the beam is cyclically deflected over the terminal anodes, a divisional pulse being passed through terminals 47, 48 to further counting means, each time the beam returns to anode 0. The shifting movement of the beam is only stopped on termination of the impulse and the duration of the signal is determined from the product of the number of anodes struck by the beam and the time required for shifting the beam from one anode to the other. The number of anodes struck by the beam is determined in a similar way as when counting signals.

The speed of the movement of the electron beam over the anodes is determined by the time constants of the stabilizing circuits. In order to make the measurement accurate up to the last counted place, it is convenient if the time constants of the stabilizing circuits corresponding

What is claimed is:

1. Pulse counting and duration measuring apparatus comprising, in combination, a cathode ray tube having a cathode, a plurality of serially arranged anodes, a first pair of deflector plates operable to shift the ray along said anodes and a second pair of deflector plates operable to shift the ray laterally of said anodes; a grid controlled valve; a source of potential; an impedance connected between said source and the anode of said valve, said first pair of plates being connected in shunt with said impedance so that the potential between said plates is a function of the impedance drop; the cathode of said tube being connected to the cathode of said valve; a feedback network operatively associated with said tube and including a plurality of voltage dividers connected in parallel between the grid and cathode of said valve, each anode being individually connected to a tap on a different divider, the circuit constants of said network being so selected that, in any given position of the ray, the anode current of said tube is so divided that the grid of said valve is maintained at a bias potential such that the voltage drop across said impedance produces a relative potential between said first pair of deflecting plates of a value maintaining the ray locked in such given position; pulse input means including circuit connections to said valve and said network to apply a pulse potential to the grid of said valve of such value that the grid bias, and thus the impedance voltage drop, is varied to an extent sufficient to change the potential of said first pair of plates to a value corresponding to a shift of the ray to the next succeeding anode; and means, including said first and second pairs of plates and an impedance network activated when the ray is directed onto the last anode, to shift the ray to the first anode.

2. Pulse counting and duration measuring apparatus comprising, in combination, a cathode ray tube having a cathode, a plurality of serially arranged anodes including one terminal "neutral" anode and the other terminal anode having an extension laterally of the intermediate anodes and extending as a conductive path to adjacent the "neutral" electrode; a first pair of deflector plates operable to shift the ray along said anodes and a second pair of deflector plates operable to shift the ray laterally of said anodes; a grid controlled valve; a source of potential; an impedance connected between said source and the anode of said valve, said first pair of plates being connected in shunt with said impedance so that the potential between said plates is a function of the impedance drop; the cathode of said tube being connected to the cathode of said valve; a feedback network operatively associated with said tube and including a plurality of voltage dividers connected in parallel between the grid and cathode of said valves, the number of voltage dividers being one less than the number of anodes and each anode except said other terminal anode being individually connected to a tap on a different divider; the circuit constants of said network being so selected that, in any given position of the ray, the anode current of said tube is so divided that the grid of said valve is maintained at a bias potential such that the voltage drop across said impedance produces a relative potential between said first pair of deflecting plates of a valve maintaining the ray locked in such given position; pulse input means including circuit connections to said valve and said network and a pulse differentiating network, operable to apply a pulse potential to the grid of said valve of such value that the grid bias, and thus the impedance voltage drop, is varied to an extent sufficient to change the potential of said first pair of plates to a value corresponding to a shift of the ray to the next succeeding anode; and a second impedance connecting said other terminal anode to the divider associated with said neutral anode; said second pair of plates being connected across said second impedance to produce a ray deflecting potential therebetween when current flows through said second impedance whereby, when the ray strikes said other terminal anode, the ray will be shifted laterally by said second pair of plates and the network constants will produce a deflecting potential between said first pair of plates of a value corresponding to focussing of the ray on said neutral anode.

3. Apparatus as claimed in claim 2 in which said pulse differentiating network includes a capacitance and a diode rectifier in series with the valve cathode and a variable impedance in parallel with said rectifier.

4. Apparatus as claimed in claim 2 in which said pulse differentiating network includes a capacitance and a diode rectifier in series with the valve cathode and a variable impedance in parallel with said rectifier; and means selectively operable to shunt said capacitance to delete the pulse differentiating action.

5. Apparatus as claimed in claim 2 including a pair of output terminals capacitatively coupled across said second impedance.

EMIL PODSKALSKÝ.

REFERENCES CITED

The following references are of record in the file of this patent:

UNITED STATES PATENTS

| Number | Name | Date |
|---|---|---|
| 2,195,098 | Skellett | Mar. 26, 1940 |
| 2,436,677 | Snyder, Jr. | Feb. 24, 1948 |
| 2,446,945 | Morton et al. | Aug. 10, 1948 |
| 2,463,535 | Hecht | Mar. 8, 1949 |
| 2,480,130 | Grieg | Aug. 30, 1949 |
| 2,498,081 | Joel, Jr., et al. | Feb. 21, 1950 |
| 2,532,738 | Six et al. | Dec. 5, 1950 |
| 2,532,747 | Van Geldre et al. | Dec. 5, 1950 |
| 2,568,449 | Hansen | Sept. 18, 1951 |